United States Patent

Kosaka

[15] 3,685,171

[45] Aug. 22, 1972

[54] INSTRUCTIONAL TAPE RECORDER

[72] Inventor: Masahiro Kosaka, Hirakata, Japan

[73] Assignee: Matsushita Electric Industrial Co., Ltd., Osaka, Japan

[22] Filed: Dec. 7, 1970

[21] Appl. No.: 95,709

[52] U.S. Cl...35/35 C, 179/100.2 MD, 179/100.2 Z, 274/4

[51] Int. Cl..............................G09b 5/04, G11b 5/00

[58] Field of Search...............35/35C; 179/100.2 Z, 100.2 MD; 274/4 C; 242/55.19 A

[56] References Cited

UNITED STATES PATENTS

| | | | |
|---|---|---|---|
| 3,175,222 | 3/1965 | Nerwin | 179/100.2 Z |
| 3,429,519 | 2/1969 | Staar | 274/4 C X |
| 3,582,569 | 6/1971 | Staar | 179/100.2 Z |
| 3,596,006 | 7/1971 | Lawhon | 179/100.2 Z X |

*Primary Examiner*—Wm. H. Grieb
*Attorney*—Wenderoth, Lind & Ponack

[57] ABSTRACT

An instructional tape recorder has a recording and a reproducing means for recording and reproducing an instructional tape which has an instructional program recorded intermittently thereon and can have the oral response of a learner to said instructional program recorded thereon on the parts of the tape between the parts of the instructional program. The instructional tape recorder is provided with a selecting switch to enable it to be used both as a conventional tape recorder and as an instructional tape recorder. This makes possible good interchangeability of a magnetic tape between the instructional tape recorder and a conventional tape recorder.

The magnetic tape having the instructional program thereon is protected against unintentional erasure of the program by an electrically conductive sheet attached to the tape case or by a break out lug in the back edge of the tape case containing the magnetic tape.

The magnetic tape is divided into four recording tracks for economy reasons, and two of said recording tracks are used for recording and reproducing the instructional program ad the oral responses of a learner, and the remaining two are used for recording and reproducing another instructional program and the oral responses of a learner when the magnetic tape case is turned over.

11 Claims, 22 Drawing Figures

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEYS

INVENTOR
MASAHIRO KOSAKA

BY Wenderoth, Lind & Ponack
ATTORNEY

INVENTOR
MASAHIRO KOSAKA

BY Wenderoth, Lind & Ponack
ATTORNEYS

INVENTOR
MASAHIRO KOSAKA

BY *Wenderoth, Lind & Ponack*
ATTORNEYS

INVENTOR
MASAHIRO KOSAKA

BY Wenderoth, Lind & Ponack
ATTORNEYS

INSTRUCTIONAL TAPE RECORDER

The applicant is also the inventor in copending applications Ser. Nos. 63,485 and 77,404 relating to instructional tape recorders which are similar to that disclosed in the present application.

BACKGROUND OF THE INVENTION

This invention relates generally to a tape recorder, and more particularly to a tape recorder for language study on which an instructional program and an oral response made to the aforementioned instructional program can be recorded.

In learning foreign language, it is considered to be quite useful for a learner to hear an instructional program repeatedly and to make oral responses to said instructional program. And it is also quite effective for a learner to hear his recorded oral response and compare it with said instructional program after the termination of successive oral responses.

This repetitive hearing and speaking makes it possible for a learner to understand and grasp an instructional program and to form proper linguistic habits in a foreign language.

The tape recorder for language study referred to herein is one which has at least two recording and reproducing channels in order to record and reproduce said instructional program and said responses of the learner, respectively.

On the other hand, a conventional tape recorder has one recording and reproducing channel to record and reproduce an instructional program. Therefore, a learner cannot record his oral responses with such a conventional tape recorder, but can only listen to the instructional program.

Generally an instructional program is recorded on a magnetic tape with intervals between two succeeding parts of the instructional program which, in practice, are composed of words or phrases.

When a learner studying foreign language with said tape recorder for language study wants to hear his oral response made during the time interval between parts of the program, he has to record his oral response with said tape recorder for language study and reproduce his recorded oral response after the tape of said tape recorder for study is rewound, in order to compare his oral response with said instructional program for a better understanding of his response.

The tape recorder for language study, therefore, has a recording facility for recording the learner's oral response. That facility gives rise to a danger of unintentional erasure of the recorded materials on the magnetic tape when a pre-recorded magnetic tape is used with said tape recorder for language study.

Another problem involving said tape recorder for language study is the interchangeability of tapes between said tape recorder for language study and a conventional tape recorder. It is desirable to be able to use the tape recorder for language study as a conventional tape recorder for recording and reproducing music or speech.

The tape recorder for language study thus has several limitations which must be removed in order that it be usable as a conventional tape recorder and yet be safe from unintentional erasure of valuable recorded materials on magnetic tapes.

OBJECTS AND SUMMARY OF THE INVENTION

It is an object of the present invention to provide a tape recorder for language study use capable of eliminating such difficulties and inconveniences.

It is a further object of the invention to provide a tape recorder for language study which makes it possible for learners to study a foreign language easily and efficiently.

It is a still further object of the invention to provide a tape recorder for language study in which the danger of unintentional erasure of recorded materials on magnetic tapes is completely eliminated.

It is another object of the invention to provide a tape recorder for language study which one can use as a conventional tape recorder as well as a language study tape recorder.

These objects are achieved by providing an instructional tape recorder for recording on or reproducing from a tape cassette containing magnetic tape therein and having a pair of holes at opposite ends of an edge thereof with breakout lugs therein, and at least one further hole with a breakout lug therein or an electrically conductive plate is provided on the edge of the cassette between the holes of the pair of holes. The tape recorder has a driving means for moving the magnetic tape, a recording and reproducing means, a recording switch coupled to the driving means and the recording and reproducing means for controlling the driving means and the recording and reproducing means to record and reproduce a learner's oral response. Actuator means are provided for actuating the recording switch. A sensing means is provided for detecting the presence or absence of a breakout lug in one of the holes of the pair of holes, and an electrical switch is operated by the sensing means. A sensing contact is provided for detecting the presence or absence of the electrically conductive plate, or a further sensing means is provided for sensing the presence or absence of a lug in the further hole. A warning signal producing means can be provided. An electrical circuit connects the recording switch, the electrical switch, the further sensing means or the sensing contact, and the warning signal producing means for stopping the operation of the instructional tape recorder and producing a warning signal when the breakout lug in either of the holes in the pair of holes in the cassette is not sensed and an electrically conductive plate or a lug in the further hole is not sensed.

BRIEF DESCRIPTION OF THE FIGURES

The details of the invention will become apparent from the following detailed description taken together with the accompanying drawings wherein.

Figure 8:
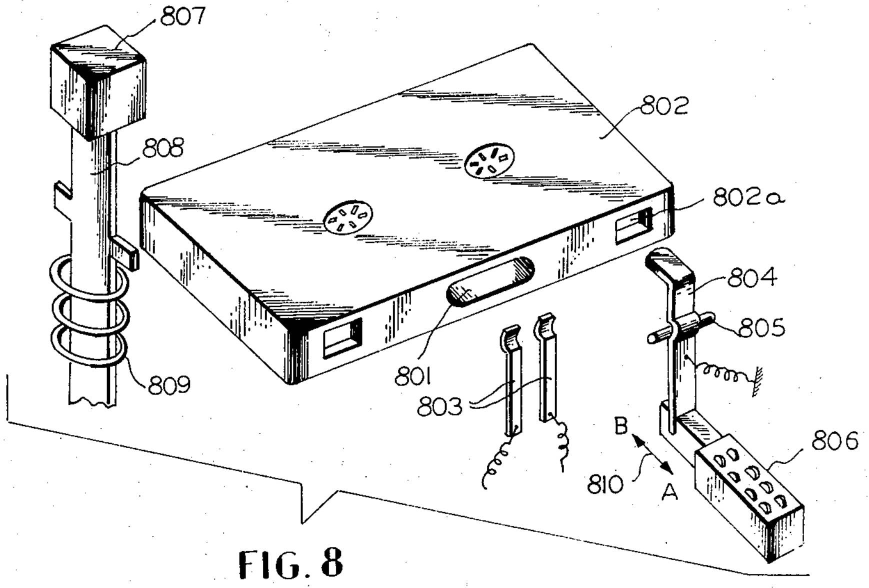
Figure 9:
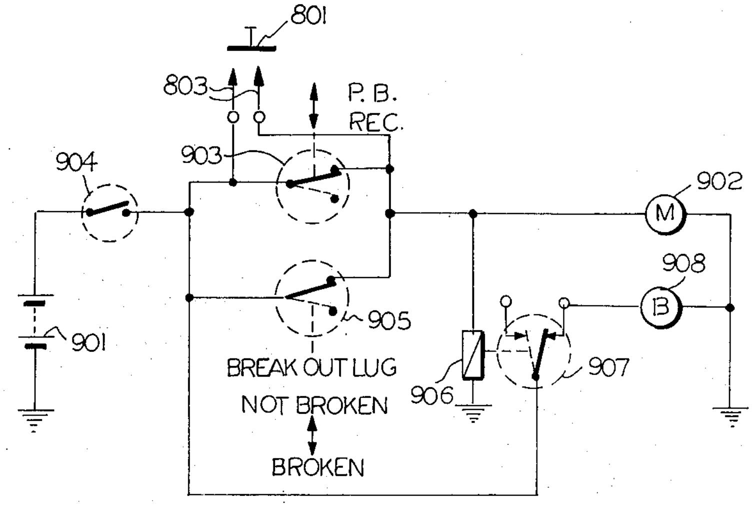
Figures 10, 11:
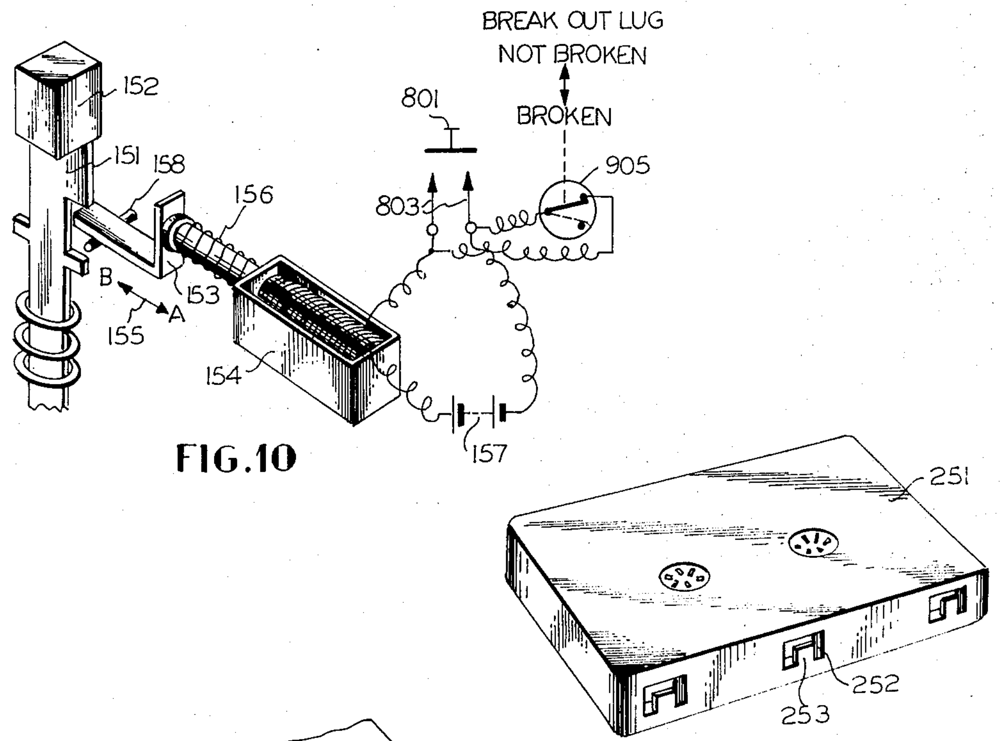
Figure 12:
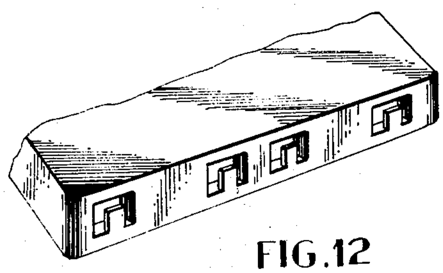
Figure 13:
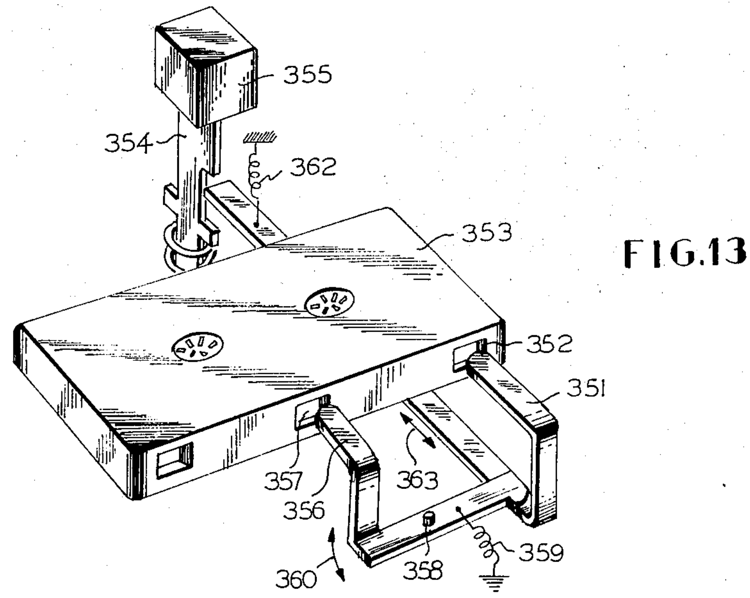
Figure 16:
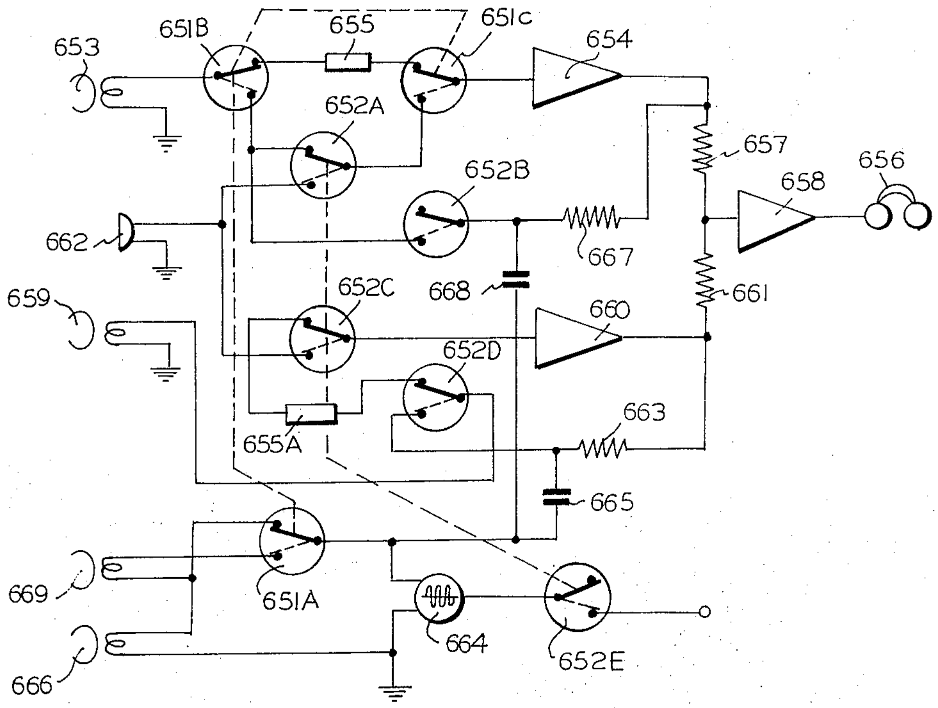
Figure 15:
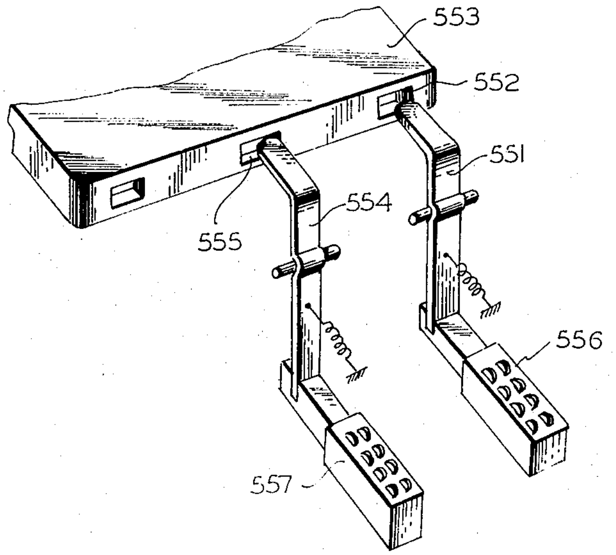
Figure 17:
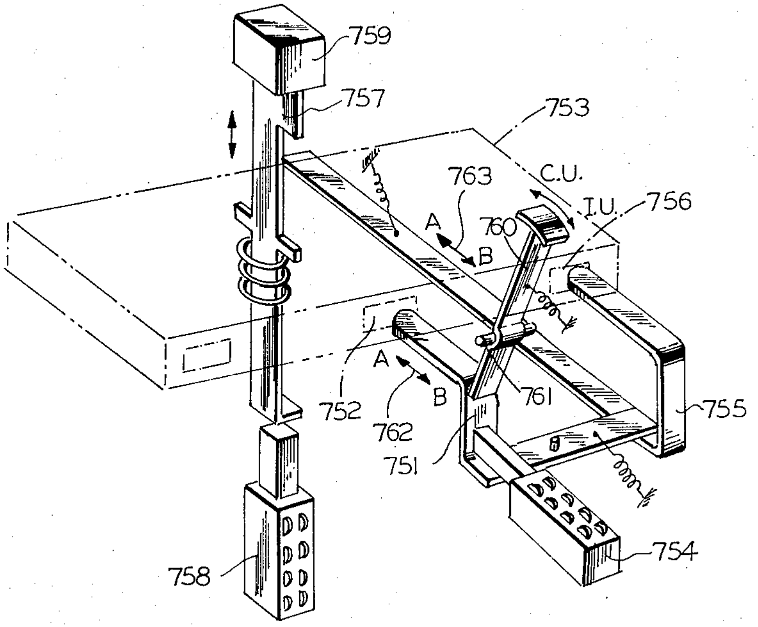
Figure 18:
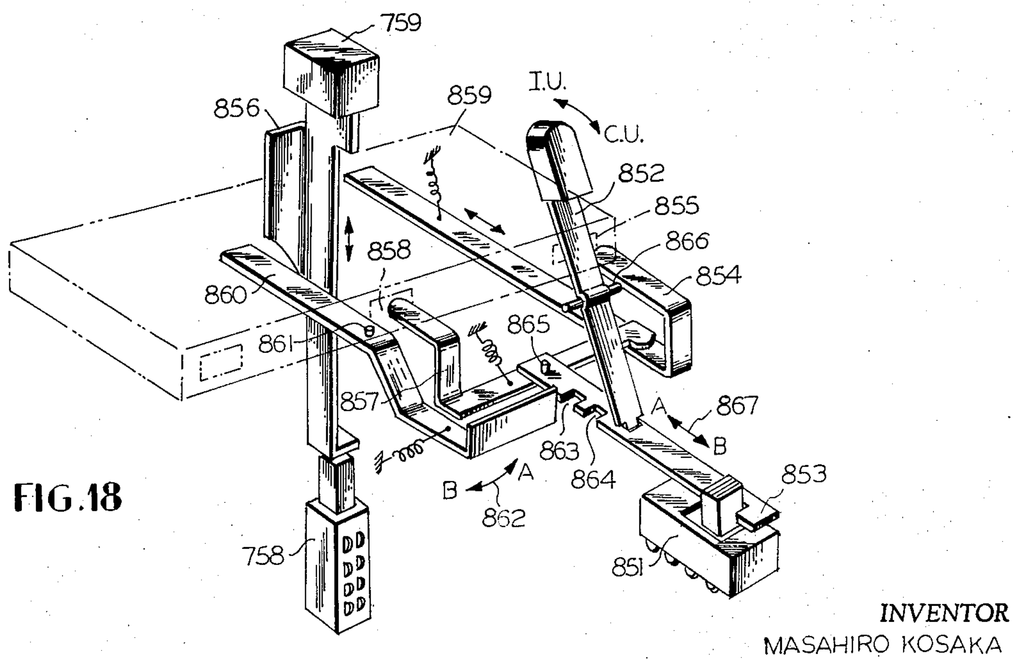
Figure 19:
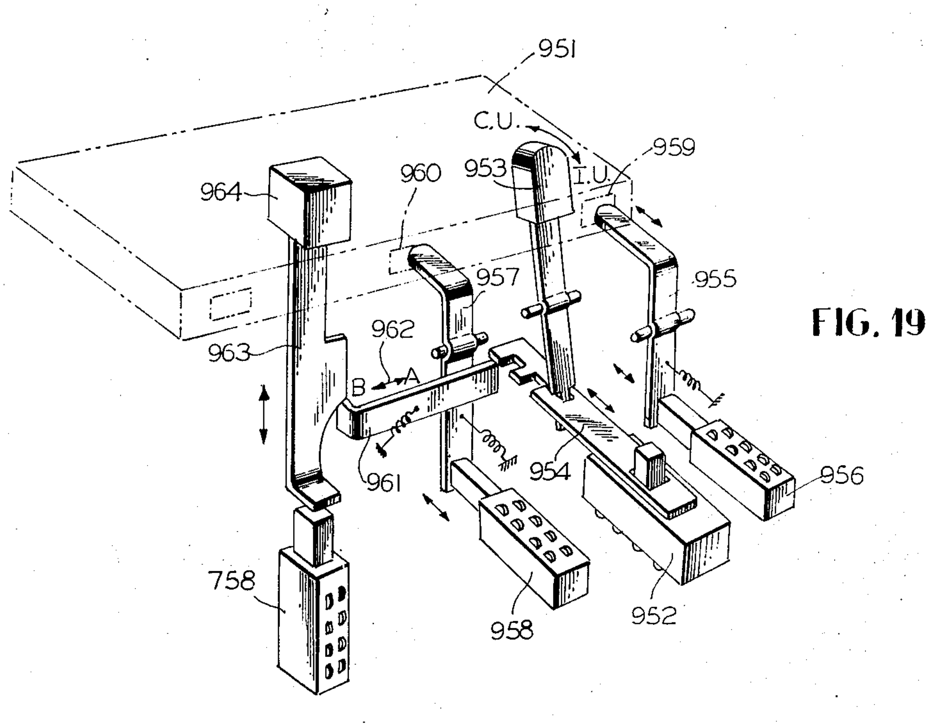
Figure 20:
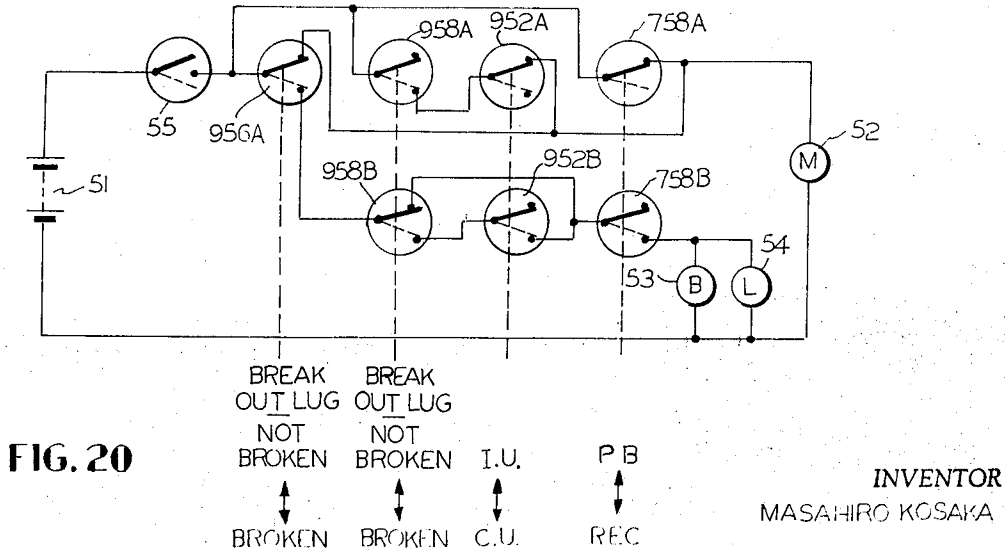

FIG. is a schematic perspective view of an operating device for preventing unintentional erasure of recorded materials by said tape recorder for language study according to the present invention;

FIG. 9 is a schematic diagram of an electrical circuit for the instructional tape recorder according to the invention as shown in FIG. 8 for controlling the supply of electrical power to the motor and for providing a warning signal;

FIG. 10 is a schematic perspective view of a preferred embodiment of the invention for locking a recording button against selective depression;

FIG. 11 is a perspective view of a tape cassette of the invention in which one extra breakout lug is provided;

FIG. 12 is a perspective view of a tape cassette of the invention in which two extra breakout lugs are provided;

FIG. 13 is a schematic perspective view of a preferred embodiment of an instructional tape recorder of the invention in which a cassette according to FIG. 11 is used;

FIGS. 14 A, 14B, and 14C are schematic diagrams of operating positions of said instructional tape recorder of the invention as shown in FIG. 13;

FIG. 15 is a schematic perspective view of another preferred embodiment of an instructional tape recorder of the invention in which a casette according to FIG. 11 is used;

FIG. 16 is a schematic diagram of an electrical circuit for a preferred embodiment of the invention;

FIG. 17 is a schematic perspective view of another preferred embodiment of the invention;

FIG. 18 is a schematic perspective view of still another preferred embodiment of the invention;

FIG. 19 is a schematic perspective view of a further preferred embodiment of the invention; and FIG. 20 is a schematic diagram of an electrical circuit for an instructional tape recorder as shown in FIG. 19 for stopping the recording operation and providing a warning signal.

DETAILED DESCRIPTION OF THE FIGURES

Before proceeding with a detailed description of the invention, a language study system using a tape recorder for language study will be explained with reference to FIG. 1, which shows a schematic view of an instructional tape.

Figure 1:
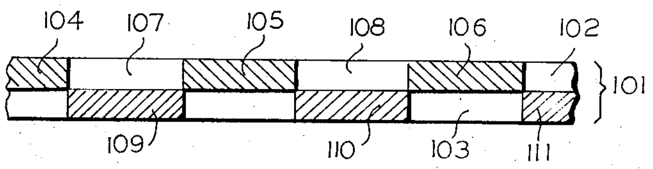
FIG. 1 is a schematic view of an instructional tape which has parts of an instructional program successively recorded thereon with moderate length blank intervals therebetween to make it possible for learners to make their oral responses within the time of these blank intervals.

Referring now to the drawings, and more particularly to FIG. 1, an instructional tap 101 shown therein has two recording tracks 102 and 103 extending along the length of said instructional tape 101. Said recording track 102 has the parts 104, 105 and 106 of an instructional program recorded successively thereon at suitable intervals 107 and 108 sufficiently long to enable a learner to finish his oral responses within these intervals.

Said recording track 103 is provided to make it possible for a learner to record his oral responses to said instructional program in the intervals between successive parts 104, 105 and 106 of the instructional program.

The oral responses of a learner are recorded onto parts 109, 110 and 111 of said recording tracks 102 when said learner makes oral responses after hearing the parts of said instructional program.

A tape recorder for language study using said instructional tape 101 has at least two recording/reproducing channels for processing both said instructional program and said oral responses of a learner.

The tape recorder for language study for utilizing a magnetic tape having parts of an instructional program successively recorded thereon is set to operate as follows. One of said two recording/reproducing channels is set to reproduce and the other of said two recording/reproducing channels is set to record in order to make it possible for a learner to hear the parts of the instructional program reproduced from the tape and to record his oral responses on said tape.

Next, both the recording/reproducing channels of said taper recorder are set to reproduce after rewinding said magnetic tape on which said instructional program and the oral responses of the learner are recorded successively on the different tracks, in order to compare the oral responses with the parts of the instructional program for better understanding.

Said recording/reproducing channels for processing the instructional program and the oral responses of the learner are hereinafter called the program channel and the student channel, respectively, for the sake of simplicity of description.

The electrical circuit of said tape recorder is not an important constituent of the tape recorder according to the invention. Therefore, a detailed description thereof has been omitted.

Figure 2:
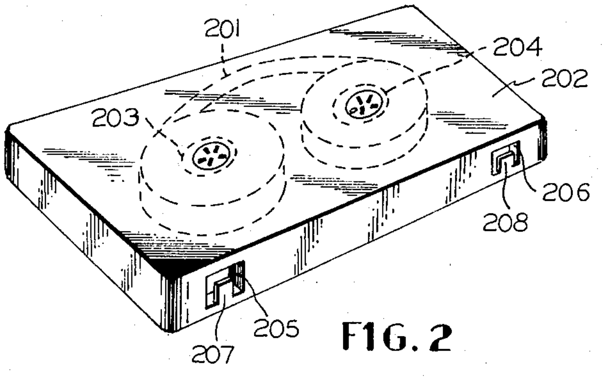
FIG. 2 is a perspective view of a conventional cassette type tape case containing a magnetic tape therein in the back of which there is a pair of holes with breakout lugs.

Referring to FIG. 2, a magnetic tape 201 shown therein is contained in a cassette 202 in order to make it possible to handle said magnetic tape easily and to protect said magnetic tape from contamination. Said magnetic tape 201 is wound on rotatable hubs 203 and 204 and the ends of said magnetic tape 201 are fixed to the respective rotatable hubs 203 and 204. The two hubs 203 and 204 are rotatably driven by supply and take-up spindles on a tape recorder inserted to said hubs 203 and 204 in order to drive said magnetic tape 201 in forward and reverse directions.

In the back of said case 202 is provided a pair of holes 205 and 206 with breakout lugs 207 and 208, respectively, for preventing unintentional erasure of recorded materials.

Whether said breakout lugs are broken out of the holes or not is detected by a sensing device on the tape recorder in order to prevent the tape recorder from recording, if said breakout lugs are broken out of the holes.

Figure 3:
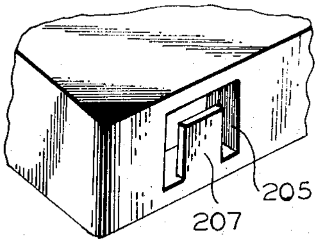
FIG. 3 is a perspective view on an enlarged scale of a corner of the casette shown in FIG. 2 showing a breakout lug.

Referring to FIG. 3, where one of said holes is shown on an enlarged scale for better understanding, said breakout lug 207 is made of rather thin plastic material in order to make it possible to break it easily.

Figure 4:
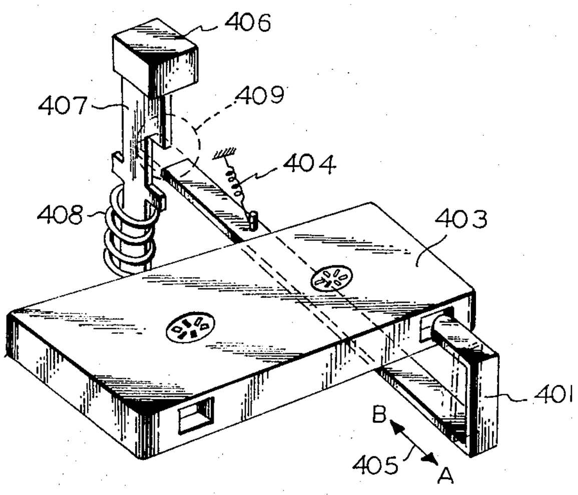
FIG. 4 is a perspective schematic view of an operating device for preventing unintentional erasure of recorded materials by a conventional tape recorder.

Referring now to FIG. 4, which shows schematically an operating device for preventing unintended erasure of recorded materials, a sensing lever 401 is slidably mounted on a chassis (not shown) of a tape recorder to detect whether a breakout lug in a hole 402 in a magnetic tape cassette 403 is broken out or not. Said sensing lever 401 is urged by a tensioned spring 404 connected to said sensing lever 401 in the direction B shown by arrow 405 and is slidably moved in the direction B if said breakout lug in said hole 402 is broken out.

A recording button 406 mounted on an actuator 407 which is slidably mounted on said chassis actuates a recording switch (not shown). Upon pushing said recording button 406, said recording switch is changed from a reproducing position to a recording position by said actuator 407 which is normally urged upwardly by a spring 408.

Said sensing lever 401 and said actuator 407 are positioned relatively in such a way that when said breakout lug in said hole 402 is not broken out, and consequently said sensing lever 401 is moved in the direction A, said actuator 407 can be pushed down; and when said breakout lug is broken out said sensing lever 401 is moved in the direction B to the position shown in dot and dash lines, and said actuator 407 cannot be pushed down because said actuator 407 encounters said sensing lever 401 at the point shown in dashed line circle 409 of FIG. 4.

When the cassette 403 is reversed to run the tape in the opposite direction, the presence or absence of the breakout lug in the hole at the other end of the cassette will be sensed by sensing lever 401.

The unintended erasure of recorded materials is thus prevented by breaking out a breakout lug in a hole in the back of a magnetic tape cassette so that its absence can be sensed by the sensing lever.

Before going into a discussion of problems arising in using the same tapes in a conventional tape recorder and a tape recorder for language study, the configurations of recording tracks on a magnetic tape for a conventional tape recorder will be briefly described with reference to FIGS. 5 and 6.

Figure 5:
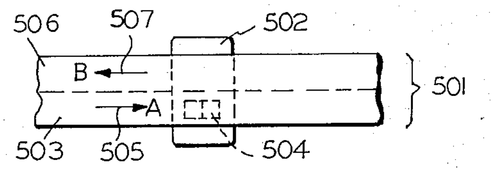
FIG. 5 is a fragmentary elevational view of a magnetic tape having two tracks thereon together with a magnetic recording and reproducing head used in a tape recorder for language study.

Referring to FIG. 5 where a conventional two track monaural magnetic tape 501 is shown together with a magnetic recording head 502, a recording signal is, at first, recorded onto a lower track 503 by a head 504 while moving the tape in the direction A shown by the arrow 505, and then said magnetic tape 501 is turned over in order to continue recording onto an upper track 506 while moving the tape in the direction B shown by the arrow 507.

Figure 6:
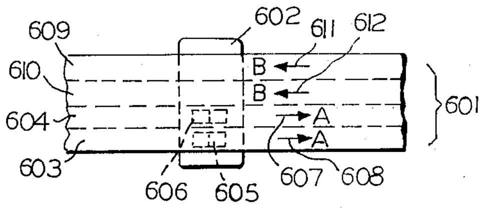
FIG. 6 is a fragmentary elevational view of a magnetic tape having four tracks thereon together with a magnetic recording and reproducing head used in a tape recorder for language study.

Referring now to FIG. 6 where a conventional four track stereo magnetic tape 601 is shown together with a magnetic recording head 602, a stereo recording signal is, at first, recorded onto two lower tracks 603 and 604 by heads 605 and 606, respectively, while moving the tape in the direction A shown by arrows 607 and 608, and then said magnetic tape 601 is turned over in order to continue recording onto upper tracks 609 and 610 while moving the tape in the direction B shown by arrows 611 and 612.

These track configurations shown in FIGS. 5 and 6 are widely used and are based on an international standard for "Compact Cassette Tape."

There will now be described the problems of the interchangeability of such tapes between a conventional tape recorder and a tape recorder for language study which will hereinafter be called an instructional tape recorder.

Figure 7:
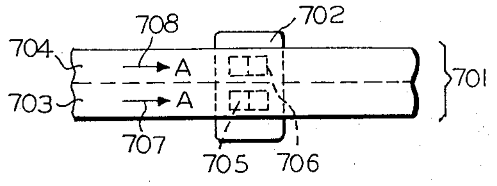
FIG. 7 is a fragmentary elevational view of a magnetic tape having two tracks thereon together with a magnetic recording and reproducing head used in an instructional tape recorder according to the present invention.

Referring to FIG. 7, where a magnetic tape 701 is shown together with a magnetic recording head 702 for an instructional tape recorder, said magnetic tape 701 has two recording/reproducing tracks 703 and 704. An instructional program and oral responses of a learner are recorded separately on the respective tracks 703 and 704 by magnetic heads 705 and 706 while moving the tape in the direction A shown by arrows 707 and 708. In this case, the magnetic tape 701 is driven in only one direction, which is different from the other two cases described with reference to FIGS. 5 and 6.

An instructional tape recorder which can utilize tape having four tracks such as shown in FIG. 6 has been developed in order to use said magnetic tape economically, and in which recording tracks 603 and 604 are used, respectively, for recording said instructional program and said oral responses of a learner when the tape is driven in one direction, and recording tracks 609 and 610 are used, respectively, for recording said instructional program and said oral responses of a learner when the tape is driven in a reverse direction when it has been turned over. In such a four track instructional tape recorder, both breakout lugs in the magnetic tape cassette are broken out in order to prevent unintentional erasure when said instructional four track tape is used in a conventional taper recorder.

Said four track instructional tape recorder, however, must be operated in a recording condition in order to record the oral responses of a learner, notwithstanding the absence of a breakout lug. This gives rise to another problem in that a pre-recorded tape of music or the like can be unintentionally erased when the instructional tape recorder is run while it is set for a recording operation.

Two breakout lugs in the back of a magnetic tape cassette are, therefore, not enough to identify the kind of magnetic tape in the cassette, i.e. whether it is an instructional tape or a pre-recorded tape of music or the like, and are not sufficient to prevent unintentional erasure.

Referring now to FIG. 8 where a schematic view of a preferred embodiment of the invention is shown, a piece of electrically conductive sheet material 801, which in practice can be a metal sheet, is attached to a magnetic tape cassette 802 which contains an instructional tape having four tracks. The piece 801 is provided in order to identify said instructional tape and to distinguish it from a conventional tape. A pair of electrical contacts 803 is provided in the tape recorder according to the invention to detect the presence of said piece of conductive sheet material 801, and sensing lever 804 rotatably mounted on a pin 805 in the tape recorder is provided to detect the presence of a breakout lug in a hole 802*a* in a conventional way for actuating a switch 806. Depression of a recording button 807 actuates a recording switch (not shown) through an actuator 808 which is pushed upwardly by a spring 809.

The operation of said instructional tape recorder will be explained with reference to FIG. 9 which is a schematic diagram of the electrical circuit of a preferred embodiment of said instructional tape recorder shown in FIG. 8.

Referring to FIG. 9, a battery 901 supplies electrical power to a motor 902 which drives the magnetic tape in the forward and reverse directions through the arrangement of switches and electrical contacts, as shown. A power switch 904 is connected in series with battery 901 and a pair of normally on switches 903 and 905 are connected in parallel between power switch 904 and motor M. Contacts 803 are also connected in parallel with switch 903. A series connected relay switch 907 and a buzzer 908 are connected in parallel with switches 903 and 905 and motor 902. The actuating coil 906 for switch 907 is connected to the circuit between switches 903 and 905 and motor M and to ground.

When a magnetic tape for instructional use in a cassette with holes having no breakout lugs therein and a piece of conductive sheet material thereon is inserted into said instructional tape recorder, said sensing lever 804 actuates said switch 806 in the direction A shown by the arrow 810, and consequently a switch 903 is switched to the off position illustrated by the dashed line in FIG. 9. Then, a learner can hear either a part of an instructional program or his recorded oral response when a power switch 904 is switched to the "ON" position, as shown in FIG. 9, and said instructional tape recorder is set for reproducing operation. But, if said recording button 807 is depressed and said recording switch (not shown) is operated, a recording switch 905 is switched to a position shown by a dashed line in FIG. 9, and electric power will not be supplied to said motor 902 from said battery 901 because it is not connected thereto through said switches 903 and 905 any more. The battery and motor are connected only through the electrical contacts 803 and said piece of conductive sheet material 801. Therefore, a learner can record his oral response by using said instructional tape recorder and said instructional tape having said piece of conductive sheet material on the cassette.

When a tape of prerecorded music in a cassette with holes having no breakout lugs therein is inserted into said instructional tape recorder, said switches 903 and 905 are switched to the positions illustrated in dashed lines in FIG. 9 in a way similar to the previous case where an instructional tape is employed. However, in this case electrical power from said battery cannot be supplied to said motor 902 and said associated circuit because the electrical contacts 803 are not connected, and consequently the relay 906 is deenergized and switches its relay contact 907 to a position shown in a solid line in FIG. 9.

This gives rise to an automatic stopping of said instructional tape recorder, and a warning sound is produced by a buzzer 908 in order to prevent an unintended erasure of recorded material and for informing a learner that he is attempting to carry out a wrong operation.

On the other hand, when a conventional magnetic tape having nothing recorded on it and which has holes in the cassette with breakout lugs therein and no conductive sheet thereon, a learner can record since switch 905 will remain closed.

Referring now to FIG. 10, which shows another preferred embodiment of the invention, an actuator 151 which drives a recording switch (not shown) has a recording button 152 thereon for depressing the actuator. The actuator can be blocked by a stop plate 153.

A magnet plunger 154 moves said stop plate 153 in the directions A and B shown by the arrow 155 when said magnet plunger 154 is energized or deenergized, respectively. Said stop plate 153 is normally urged in the direction B by a spring 156 engaged therewith. A battery 157 is connected in a circuit with parallel connected contacts 803 and switch 905 for energizing said magnet plunger 154 when a conductive sheet 801 short circuits electrical contacts 803 or said switch 905 is closed by movement of a sensing lever, such as lever 804 of FIG. 8, into a hole in a cassette from which he breakout lug has been removed.

The operation of an instructional tape recorder with the device of FIG. 10 is as follows. When a cassette having therein a magnetic tape for instructional use is inserted into he instructional tape recorder, the piece of conductive sheet material 801 short circuits said electrical contacts 803 energizing said magnetic plunger 154. Then said stop plate 153 moves in the direction A to free said actuator 151 so that it can be pushed down. This makes it possible for a learner to actuate the tape recorder for a recording operation. When, on the other hand, a cassette having prerecorded music on the tape and having no piece of conductive sheet material thereon and having the breakout lug removed is inserted into said instructional tape recorder, the magnetic plunger 154 is not energized and, consequently, said stop plate 153 blocks downward movement of said actuator 151 to prevent unintentional erasure of said tape. Said stop plate 153 is slidably mounted in a recess 158 in the chassis (not shown) of said instructional tape recorder.

The cassette having an instructional tape therein with an instructional program recorded thereon can have two pieces of conductive sheet material thereon in order to prevent unintentional erasure of both sides of said instructional tape when both sides of said instructional tape have an instructional program recorded thereon and can be used for a language exercise and can have a piece of conductive sheet material on one portion of the edge and not on the other when one side of the tape has an instructional program thereon and the other side has pre-recorded music, for instance, and it is not to be used for a language exercise.

A different type of an instructional tape recorder from those described hereinbefore will be described hereinafter and which has means for preventing unintentional erasure of recorded materials.

Referring now to FIG. 11, a magnetic tape cassette 251 having an instructional tape therein has an extra hole 252 in the edge thereof with a breakout lug 253 therein which is provided in order to indicate whether the tape in the cassette is an instructional tape or a music tape. The cassette can have two extra holes and breakout lugs as shown in FIG. 12 to provide a separate indication for each side of a tape.

Referring now to FIG. 13, there is shown a preferred embodiment of the pertinent parts of the instructional tape recorder which includes means for utilizing the said extra holes in the cassette of FIGS. 11 and 12. A first sensing lever 351 is provided which detects the presence or absence of a breakout lug in a hole 352 in the magnetic tape cassette 353, and blocks a downward movement of actuator 354 which operates a recording switch (not shown) and which has a depression button 355 thereon for depressing the actuator 354 in a way similar to that described with reference to FIG. 4.

A second sensing lever 356 is provided which detects the presence or absence of a breakout lug in the extra hole 357 of said magnetic tape cassette 353 and when no breakout lug is sensed moves said first sensing lever 351 in the direction A shown by arrow 363. Said second sensing lever 356 is rotatably mounted on the chassis (not shown) by a pin 358 and has a spring 359 connected thereto urging lever 356 to direction A shown by arrow 360. Said spring 359 is strong enough to move said sensing lever 351 in the direction A against the force of the spring 362 normally urging sensing lever 351 into the actuator blocking position.

The operation of said instructional tape recorder will be explained with reference to FIGS. 14A, 14B and 14C, in which the two sensing levers 351 and 356 are shown in various positions in accordance with the type of tape in the cassette 353.

Figure 14A:
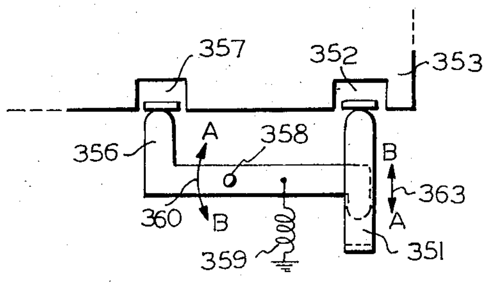

Referring in FIG. 14A, when a conventional magnetic tape is provided in the cassette 353, breakout lugs are left in both holes 352 and 257, and sensing levers 351 and 356 move in the direction A shown by said arrow 363 and B shown by said arrow 360, respectively. The movement of said first sensing lever 351 in the direction A frees said actuator 354 so it can be pushed down in order to set said instructional tape recorder for a recording operation.

Figure 14B:
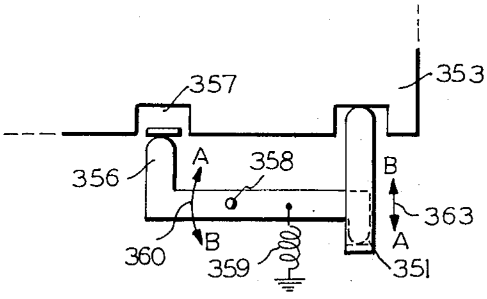

Referring to FIG. 14B, when a tape having prerecorded music thereon is provided in the cassette, the breakout lug in holes 352 at each end of said magnetic tape cassette 353 are broken out, and said first sensing lever 351 moves in the direction B shown by said arrow 363 while said second sensing lever 356 moves in the direction B shown by said arrow 360. The movement of said first sensing lever 351 in the direction B blocks said actuator 354 and the instructional tape recorder cannot be set for a recording operation.

Figure 14C:
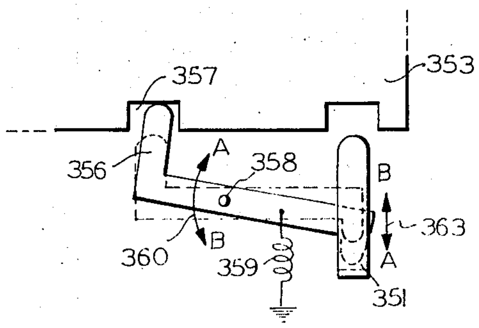

Referring to FIG. 14C, when an instructional tape is provided in the cassette and the breakout lugs in all the holes are broken out, said first and second sensing levers 351 and 356 move in the direction B and A, respectively. Since said spring 359 connected to said second sensing lever 356 is stronger than said spring 362 connected to said first sensing lever 351, said first sensing lever 351 is moved in the direction A by said second sensing lever 356. The movement of said first sensing lever 351 unblocks said actuator 354 enabling it to be depressed in order to set said instructional tape recorder for a recording operation.

Referring now to FIG. 15, there is shown another preferred embodiment of an instructional tape recorder which can sense said extra holes in a tape cassette as shown in FIGS. 11 and 12. A first sensing lever 551 is provided for detecting the presence or absence of a breakout lug in a hole 552 in a magnetic tape cassette 553 and a second sensing lever 554 is provided for detecting the presence or absence of a breakout lug in a hole 555 in the cassette. Said first and second sensing levers 551 and 554 operate switches 556 and 557, respectively.

An operation of aforesaid instructional tape recorder is similar to that described previously with reference to FIGS. 8 and 9. Said switches 556 and 557 have the same function as said switch 806 and said electrical contacts 803, respectively.

Therefore, said instructional tape recorder stops and produces a warning signal when one operates said instructional tape recorder in a wrong way, in order to prevent unintentional erasure of recorded materials.

An instructional tape recorder which has various means to prevent unintentional erasure as described above can also be used where the tape has four tracks. However, in such case there arises another kind of problem and various ways to overcome said problem will be described hereinafter.

A learner can use a four track instructional tape recorder as a conventional tape recorder by using the student response channel to record. In this case, a signal is recorded on and reproduced from tracks 604 or 610, as shown in FIG. 6, of a magnetic tape.

There will be no trouble when the recording and the reproduction are carried out in the same instructional tape recorder or within the same kind of said instructional tape recorder. However, when a magnetic tape recorded on an instructional tape recorder is reproduced by a conventional tape recorder for handling tapes having a track configuration as shown in FIG. 5, the instructional program and the recorded signal are reproduced simultaneously.

Because of this situation, there is no interchangeability of magnetic tapes between four track instructional tape recorders and conventional two track tape recorders.

The instructional tape recorder according to the present invention can include means to change the track configuration on a magnetic tape in order to obtain a better interchangeability of said magnetic tape between said instructional tape recorder and a conventional tape recorder. Said means comprise a switch which has two positions, an instructional use position (I.U.) and conventional use position (C.U.). When said switch is switched to the I.U. position, the signal for the student response channel is recorded on said track 604 (or 610 when the magnetic tape is turned over), and on the other hand when said switch is switched to the C.U. position, the signal for the student response channel is recorded on both said tracks 603 and 604 (or 609 and 610 when a magnetic tape is turned over) simultaneously in a way similar to that of a conventional tape recorder.

Referring now to FIG. 16 where a schematic diagram of an electrical circuit of a preferred embodiment of the invention to carry out the aforesaid function is shown, ganged changeover switches 651A, 651B and 651C are provided to change the track configuration.

The instructional tape recorder having the electrical circuit as shown in FIG. 16 operates the same as the instructional tape recorder described with reference to FIGS. 8–15, except for changing the track configuration by means of said switches 651A, 651B and 651C.

The circuit of FIG. 16 has instruction recording and reproducing head 653 connected in series through the switch arm and one contact of changeover switch 651B and through a reproducing equalizer 665, a contact and the switch arm of a second changeover switch 651C, and amplifier 654, a mixing resistor 657, and a monitor amplifier 658 to headphones 656. Response recording and reproducing head 659 is connected in series through the arm and one contact of recording and reproducing switch 652D, a reproducing equalizer 655a, one contact and the arm of recording and reproducing switch 652C, amplifier 660 and mixing resistor 661 and thence to monitor amplifier 658 and headphones 656. A microphone 662 for recording is connected in series through one contact and the arm of recording and reproducing switch 652A, to the other contact of changeover switch 6521C, the amplifier 654, a recording resistor, through the arm and one contact of recording and reproducing switch 652B through the other contact of the changeover switch 651B to the instructional recording and reproducing head. The other contact of recording nd reproducing switch 652A is also connected to the other contact of changeover switch 651B. The microphone 662 is also connected in series through the other contact and the arm of recording and reproducing switch 652C, the amplifier 660, recording resistor 663, and the other contact and arm of recording and reproducing switch 652D to the response recording and reproducing head 659. An erase circuit is provided comprising two erase heads 666 and 669, one side of each head being connected to one contact of a changeover switch 651A, the arm of the changeover switch 651A being connected to an oscillator 664 which is supplied with power through a record and reproduce switch 652E. The oscillator is also connected to the other side of the erase head 666, while the other side of the erase head 669 is connected to the other contact of the changeover switch 651A. The oscillator 664 is also connected through coupling capacitor 668 and 665 to the recording circuits to the recording and reproducing heads 653 and 659.

Since switches 652A, 652B, 652C, 652D and 652E are ganged record-reproduce switches, they are operated simultaneously be a recording button.

When said switches 651A, 651B and 651C are switched to the I.U. position, shown in solid lines, and said switches 652A, 652B, 652C, 652D and 652E are switched to a reproducing position shown in solid lines in FIG. 16, an instructional program recorded on said track 603 is reproduced by the magnetic recording/reproducing head 653 and is led to the amplifier 654 through said switches 651B and 651C and the reproducing equalizer 655, and is further led to the headphone 656 through a mixing resistor 657 and the monitor amplifier 658, and the oral response of a learner recorded on said track 604 is reproduced by the magnetic recording/reproducing head 659 and is led to the amplifier 660 through said switches 652D, 652C and the reproducing equalizer 655*a* and is further led to said headphone 656 through the mixing resistor 661 and said monitor amplifier 658, so that both the instructional program and the recorded oral response are head successively.

When said switches 651A, 651B and 651C remain in the I.U. position and said switches 652A, 652B, 652C, 652D and 652E are switched to the recording position, as shown in dashed lines in FIG. 16, said instructional program is reproduced in a way similar to that previously explained. A signal from the microphone 662 is fed to said magnetic recording/reproducing head 659 through said switch 652C, said amplifier 660, the recording resistor 663 and said switch 652D in series together with a bias signal from the bias oscillator 664 through the coupling capacitor 665.

Prior to a new recording, the old recorded signal on said track 604 will be erased by the erasing head 666 to which a bias signal is supplied from said bias oscillator 664 through said switch 651A.

Therefore, said signal from said microphone 662 is recorded on said track 604 (or 608 when the magnetic tape is turned over) through said magnetic recording/reproducing head 659.

When, on the other hand, said switches 651A, 651B and 651C are switched to the C.U. position as shown in dash lines and said switches 652A, 652B, 652C, 652D and 652E are switched to a reproducing position as shown in solid lines, the switching os said switches 651A, 651B and 651C has no effect and the signal from track 604 is reproduced exactly the same way as explained above. However, the signal from track 603 is fed through switches 651B, 652A and 651C, and then through amplifier 654 to headphones 656.

When, however, said switches 651A, 651B and 651C are switched to the C.U. position as shown in dash lines and said switches 652A, 652B, 652C, 652D and 652E are switched to the recording position as shown in dashed lines, the signal from said microphone 662 is led to both magnetic recording/reproducing heads 653 and 659. The signal for head 653 is led through said switches 652A and 651C, said amplifier 654, a recording resistor 667, said switch 652B and said switch 651B in series. The signal for head 659 is led through said switch 652C, said amplifier 660, said recording resistor 663 and said switch 652D in series.

The bias oscillator 664 supplies a bias signal to each of said magnetic recording/reproducing heads 653 and 659 through a coupling capacitor 668 and said coupling capacitor 665, respectively.

Prior to recording a new signal, the old recorded signals on said tracks 607 and 608 are erased simultaneously by erasing head 669 and erasing head 666, respectively.

Thus the signal from said microphone 662 is recorded on both of said tracks 603 and 604 (or 607 and 608 when the magnetic tape is turned over) simultaneously in a way similar to that in a conventional tape recorder.

Complete interchangeability of magnetic tapes between said instructional tape recorder and a conventional tape recorder is thus made possible.

However, another kind of problem arises, namely that an instructional program may be erased when a learner selects said C.U. position and makes a recording by mistake. There are various ways to eliminate said problem in a four track instructional tape recorder.

Referring now to FIG. 17 in which is shown the essential parts of a preferred embodiment of an instructional tape recorder for eliminating the problem described above, a second sensing lever 751 is provided for detecting the presence or absence of a breakout lug in an extra hole 752 in a magnetic tape cassette 753 and which operates a switch 754 containing changeover switches such as 651A, 651B, and 651C in FIG. 16 for changing the track configuration.

A first sensing lever 755 is provided for detecting the presence or absence of a hole 756 in the cassette 753 and when no lug is detected moves to block an actuator 757. Said actuator 757 operates a recording switch 758 containing switches 652A, 652B, 652C, 652D and 652E as in FIG. 16. The actuator 757 has a recording button 759 by which it is depressed. An indicating lever 760 is rotatably mounted on the chassis (not shown) by a pin 761 and indicates the position of said switch 754, i.e. whether it is set to the C.U. position or to the I.U. position.

The operation of said instructional tape recorder shown in FIG. 17 is the same as that explained previously with reference to FIG. 13, except for the switching of the track configuration.

When a cassette having an instructional tape therein and having no breakout lug in either said hole 752 or said hole 756 is inserted into said instructional tape recorder, said second sensing lever 751 moves in the direction A indicated by an arrow 762 changing said switch 754 to the I.U. position and moving said indicating lever 760 to the I.U. position. Simultaneously said first sensing lever 755 moves in the direction B shown by an arrow 763 and this movement enables said actuator 757 to be depressed.

When a cassette having a tape with pre-recorded music thereon and having a breakout lug in said hole 752 and no breakout lug in said hole 756 is inserted into said instructional tape recorder, said second sensing lever 751 moves in the direction B changing said switch 754 to the C.U. position and moving said indicating lever 760 to the C.U. position. Simultaneously said first sensing lever 755 moves in the direction A and blocks downward movement of said actuator 757.

When a cassette with conventional tape therein and having breakout lugs in both holes 752 and 756 is inserted into said instructional tape recorder, said second sensing lever 751 moves in the direction B changing said switch 754 to the C.U. position and moving said indicating lever 760 to the C.U. position. Simultaneously said first sensing lever 755 moves in the direction B freeing said actuator 757 so it can be depressed.

Therefore, said instructional tape recorder selects automatically the track configuration for the magnetic tape and prevents unintended erasure of recorded material.

Referring now to FIG. 18, there is shown a schematic diagram of a further preferred embodiment of an instructional tape recorder according to the invention. A switch 851 for selecting the track configuration is operated manually by a selecting lever 852 and an actuator 853 coupled thereto. Said selecting lever 852 is rotatably mounted on said chassis (not shown) on a pin 866.

A first sensing lever 854 is provided for detecting the presence or absence of a breakout lug in a hole 855 in cassette 859 and blocks an actuator 856 when no lug is sensed. A second lever 857 is provided which detects the presence or absence of a breakout lug in a hole 858 of the cassette 859 and rotates to move said first sensing lever 854 to the unlocking position when no lug is sensed. Said second sensing lever 857 and said actuator 853 are rotatably connected together by a pin 865. A locking lever 860 rotatably mounted on a pin 861 on a chassis (not shown) is pivoted to lock said actuator 853 against movement when a recording button 759 is depressed to depress actuator 856. Depression of actuator 856 turns said locking lever 860 in the direction A shown by circular arrow 862. A locking of said actuator 853 is achieved by insertion of said locking lever 860 into slots 863 or 864 in said actuator 853.

When said selecting lever 852 is moved to the C.U. position, that is, said actuator 853 is moved in the direction A shown by an arrow 867, said second sensing lever 857 cannot push said first sensing lever 854 in the unblocking direction when a breakout lug is broken out of said hole 858 because the position of said pin 865 is blocked from movement away from the cassette 859. Therefore, the movement of said first sensing lever 854 depends only on the presence or absence of a breakout lug in said hole 855 and does not depend on any movement of said second sensing lever 857.

Said recording button 759 thus cannot be depressed when an instructional tape or a tape with pre-recorded music thereon is used because the cassettes have no breakout lug in said hole 855. However, a recording can be made on a conventional magnetic tape because the breakout lug in said hole 855 in the cassette therefor is not broken out.

When, on the other hand, said selecting lever 852 is moved to the I.U. position, said actuator 853 is moved in the direction B shown by said arrow 867, and said second sensing lever 857 pushes said first sensing lever 854 in the unblocking direction when said breakout lug in said hole 858 in the cassette is broken out because the position of said pin 865 is moved toward said switch 851. Therefore, the movement of said first sensing lever 854 depends on the presence of absence of breakout lugs in both holes 855 and 858, in a way similar to that explained with reference to FIG. 17.

Therefore, said instructional tape recorder prevents unintentional erasure of recorded materials automatically in accordance with the types of magnetic tapes and the position of said selecting switch for selecting a track configuration.

Referring now to FIG. 19, in the preferred embodiment of an instructional tape recorder, according to the invention which is shown therein, the track configuration on the magnetic tape 951 can be selected by a selecting switch 952 actuated by a selecting lever 953 and an actuator 954, and prevention of unintentional erasure is achieved electrically by means which prevent the recording function of said instructional tape recorder automatically and provide a warning signal depending on the type of magnetic tape and the position of said selecting switch 952.

A first sensing lever 955 is provided which actuates a switch 956 and a second sensing lever 957 is provided which actuates a switch 958. The sensing levers detect the presence or absence of breakout lugs in holes 959 and 960, respectively, in the magnetic tape cassette 951. A locking lever 961 is provided which is slidably mounted on a chassis (not shown) so as to move in the direction A of arrow 962 when an actuator 963 for actuating the tape recorder in a recording operation and having a recording button 964 thereon is depressed. This locks said actuator 954 against movement when said instructional tape recorder is recording. The locking of said actuator 954 is achieved in a manner similar to that of the apparatus as shown in FIG. 18.

The circuit for said instructional tape recorder which is operated by the apparatus of FIG. 19 is shown in FIG.

20 Switches 956A, 758A, and 958B, 952A and 952B and 958A and 958B are, respectively, switch contacts actuated by switches 956, 958, 952 and 758 shown in FIG. 19. A battery 51 supplies an electrical power to a motor 52 for driving the magnetic tape, to a warning buzzer 53 and to a warning lamp 54, through a power switch 55 and a circuit including said switches 956A, 958A, 958B, 952A and 952B, and 758A and 758B. Switch contact 758A has the arm and one contact connected in series with the power switch 55 between the battery 51 and the motor 52. The switch contact 956A has the arm and one contact connected in parallel with the switch contact 758A. Switch contacts 958A and 952A have their arms and one contact connected in series and the series connection is also connected in parallel with the switch contact 758A. The lamp 54 and buzzer 53 are connected in parallel and they are connected in series to one contact of switch contact 758B, the arm of which is connected in series through one contact and the arm of switch contact 958B to the other contact of switch contact 956A. The other contact of switch contact 958B is connected to the arm of switch contact 758B through switch contact 952B.

When said recording switches 758A and 758B are actuated to the reproducing position as shown in solid lines, any combination of positions of said switches 958A and 958B, 956A and 952A and 952B as set by said first and second sensing levers 955 and 957 and said selecting lever 953 will permit energizing of said motor 52 and not cause said warning buzzer 53 and said warning lamp 54 to operate.

On the other hand, when said recording switches 758A and 758B are switched to a recording position as shown in dotted lines by depressing said recording button 964, the following combinations of positions of said switches 958A and 958B, 956A and 952A and 952B will cut off said power supply to said motor 52 and make said warning buzzer 53 sound and illuminate said warning lamp 54. The remainder of the combinations of switch positions will not affect said motor 52 nor produce any warning signal.

Combinations causing automatic stopping of said motor 52 and production of a warning signal:

A. Said selecting switch 952 is positioned in the C.U. position (as shown in dashed lines in FIG. 20) and the cassette has an instructional tape therein, with the breakout lugs in holes 959 and 960 broken out, so that switch contact 956A is in the dotted line position, and the switch contacts 958A and 958B and switch contacts 952A and 952B are in the dotted line positions. When the actuator 963 is pushed down, switch contacts 758A and 758B are moved to the dotted line positions, the circuit to the motor 52 is broken and the circuit to the buzzer 53 and the lamp 54 is completed.

B. Said selecting switch 952 is positioned either in the I.U. or the C.U. position and the cassette has a tape with prerecorded music thereon with the breakout lug in hole 959 broken out, so that switch contact 956A is in the dotted line position, and switch contact 958A and 958B are in the solid line positions, and switch contacts 952A and 952B are in either position. When the actuator 963 is pushed down, switch contacts 758A and 758B are moved to the dotted line positions, the circuit to the motor 52 is broken at switch contact 958A, and the circuit to the buzzer 53 and the lamp 54 is completed, bypassing the switch contact 952B.

Combinations of positions of the parts of the apparatus which will not cause automatic stopping of the motor and no warning signal or sound:

A. The selecting switch 952 is positioned in the I.U. position with the switch contacts 952A and 952B in the solid line positions and a cassette with an instructional tape therein is positioned in the tape recorder with lugs broken out of both holes 959 and 960 so that switch contact 956A is in the dotted line position and the switch contacts 958A and 958 are in the dotted line positions, and the switch contacts 952A and 952B are in the solid line positions. When the actuator 963 is pushed down, the circuit to the motor 52 remains completed through switch contacts 958A and 952A, while the circuit to the buzzer 53 and the lamp 54 is broken at the switch contact 952B.

B. The selecting switch 962 is positioned in either position and the cassette has lugs present in both holes therein so that the switch contact 956A is in the solid line position. The circuit to the motor 52 is completed through the switch contact 956A and the circuit to the buzzer 53 and the lamp 54 is broken at the switch contact 956A.

Therefore, said instructional tape recorder of FIGS. 19 and 20 prevents unintentional erasure of recorded material automatically by stopping the recording function of said instructional tape recorder and by providing a warning signal depending on the type of magnetic tape and the position of said selecting switch for selecting the track configuration.

Although preferred embodiments of the invention have been set forth in detail, it is desired to emphasize that they are not intended to be exhaustive or necessarily limitative. On the contrary, the disclosure herein is for the purpose of illustrating the invention and thus to enable others skilled in the art to adapt the invention in such ways as meet the requirements of particular applications, it being understood that various modifications can be made without departing from the scope of the invention.

What is claimed is:

1. An instructional tape recorder for recording on or reproducing from a tape cassette containing magnetic tape therein and having a pair of holes at opposite ends of an edge thereof with breakout lugs therein, and at least one electrically conductive plate attached to said edge of said tape cassette between said holes, said tape recorder comprising a driving means for moving said magnetic tape, a recording and reproducing means, a recording switch coupled to said driving means and said recording and reproducing means for controlling said driving means and said recording and reproducing means to record and reproduce a learner's oral response, actuator means for actuating said recording switch, a sensing means for detecting the presence or absence of a breakout lug in one of the holes, an electrical switch operated by said sensing means, a sensing contact for detecting the presence or absence of said electrically conductive plate, a warning signal producing means, and an electrical circuit connected with said recording switch, said electrical switch, said sensing contact and said warning signal producing means for stopping the recording operation of said instructional tape recorder and producing a warning signal when the breakout lug in the one hole in the cassette is not sensed and an electrically conductive plate is not sensed on the tape cassette.

2. An instructional tape recorder as claimed in claim 1 wherein said circuit includes a locking means connected with said sensing means and movable into and out of locking position relative to said actuator and actuated to lock said actuator means against movement to switch said recording switch when the breakout lug is broken out and the electrically conductive plate is not on the tape cassette.

3. An instructional tape recorder for recording on or reproducing from a tape cassette containing magnetic tape therein and having a pair of holes at opposite ends of an edge thereof with breakout lugs therein and at least one further hole in said edge between said two holes with a further breakout lug therein, said tape recorder comprising a driving means for moving said magnetic tape, a recording and reproducing means, a recording switch coupled to said driving means and said recording and reproducing means for controlling said driving means and said recording and reproducing means to record and reproduce a learner's oral response, actuator means for actuating said recording switch, a first sensing means for detecting the presence or absence of a breakout lug in one of the pair of holes and a second sensing means for detecting the presence or absence of a breakout lug in the further hole, and locking means connected with said first and second sensing means and movable into and out of locking position relative to said actuator and actuated to lock said actuator means against movement to switch said recording switch when the breakout lugs in the holes of the pair of holes re broken out and not sensed by said first sensing means and the lug in said further hole is not broken out and is sensed by said second sensing means.

4. An instructional tape recorder for recording on or reproducing from a tape cassette containing magnetic tape therein and having a pair of holes at opposite ends of an edge thereof with breakout lugs therein and at least one further hole in said edge between said two holes with a further breakout lug therein, said tape recorder comprising a driving means for moving said magnetic tape, a recording and reproducing means, a recording switch coupled to said driving means and said recording and reproducing means for controlling said driving means and said recording and reproducing means to record and reproduce a learner's oral response, actuator means for actuating said recording switch, a first sensing means for detecting the presence or absence of a breakout lug in one of the pair of holes and a second sensing means for detecting the presence or absence of a breakout lug in the further hole, first and second electrical switches connected respectively to said first and second sensing means, an electrical circuit connected with said recording switch and said first and second electrical switches for stopping the recording operation of said instructional tape recorder when the breakout lugs in the pair of holes in the cassette are broken out and not sensed and the lug in the further hole is not broken out and is sensed.

5. An instructional tape recorder as claimed in claim 4 in which said electrical circuit includes a warning signal producing means which produces a warning signal when the breakout lugs are not sensed in said holes.

6. An instructional tape recorder for recording on or reproducing from a tape cassette containing magnetic tape therein and having a pair of holes at opposite ends of an edge thereof with breakout lugs therein and at least one further hole in said edge between said two holes with a further breakout lug therein, said tape recorder comprising a driving means for moving said magnetic tape, a recording and reproducing means, a recording switch coupled to said driving means and said recording and reproducing means for controlling said driving means and said recording and reproducing means to record and reproduce a learner's oral response, actuator means for actuating said recording switch, a selecting switch for connecting a program channel of said recording and reproducing means to a student channel of said recording and reproducing means in order to cause the recording and reproducing means in order to cause the recording and reproducing means to function as a conventional monoural tape recorder and as said instructional taper recorder selectively, a first sensing means for detecting the presence or absence of a breakout lug in one of the pair of holes and a second sensing means for detecting the presence or absence of a breakout lug in the further hole, and locking means connected with said first and second sensing means and movable into and out of locking position means against movement to switch said recording switch when the breakout lug in said further hole is not broken out and is sensed by said sensing means, said selecting switch being engaged by said second sensing means for movement to the position for operation of the recording and reproducing means as an instructional tape recorder when said second sensing means detects the presence of a breakout lug.

7. An instructional tape recorder as claimed in claim 6 further comprising an indicating means actuated by said second sensing means for informing a learner whether said instructional tape recorder is switched to operate as a conventional tape recorder or as an instructional tape recorder.

8. An instructional tape recorder for recording on or reproducing from a tape cassette containing magnetic tape therein and having a pair of holes at opposite ends of an edge thereof with breakout lugs therein and at least one further hole in said edge between said two holes with a further breakout lug therein, said tape recorder comprising a driving means for moving said magnetic tape, a recording and reproducing means, a recording switch coupled to said driving means and said recording and reproducing means for controlling said driving means and said recording and reproducing means to record and reproduce a learner's oral response, actuator means for actuating said recording switch, a selecting switch and a selecting lever connected thereto for actuating said selecting switch to connect a program channel of said recording and reproducing means to a student channel of said recording and reproducing means in order to cause the recording and reproducing means in order to function as a conventional monoural tape recorder and as an instructional tape recorder selectively, a first sensing means for detecting the presence or absence of a breakout lug in one of the pair of holes and a second sensing means for detecting the presence or absence of a breakout lug in the further hole, and locking means connected with said first and second sensing means and movable into and out of locking position relative to said actuator and actuated to lock said actuator means against movement to switch said recording switch when the breakout lug in the further hole is not broken out and is sensed by said sensing means and said selecting lever is positioned to cause said recording and reproducing means to function both as a conventional tape recorder and an an instructional tape recorder, and said locking means is actuated to lock said actuator against movement when the breakout lug in one of said pair of holes is broken out and not sensed by said first sensing means and said selecting lever is positioned to cause said recording and reproducing means to function as an instructional tape recorder.

9. An instructional tape recorder as claimed in claim 8 further comprising a second locking means connected with said actuator and with said selecting lever for locking said selecting lever against operation when said actuator is moved to actuate said recording switch.

10. An instructional tape recorder for recording on or reproducing from a tape cassette containing magnetic tape therein and having a pair of holes at opposite ends of an edge thereof with breakout lugs therein and at least one further hole in said edge between said two holes with a further breakout lug therein, said tape recorder comprising a driving means for moving said magnetic tape, a recording and reproducing means, a recording switch coupled to said driving means and said recording and reproducing means for controlling said driving means and said recording and reproducing means to record and reproduce a learner's oral response, actuator means for actuating said recording switch, a selecting switch and a selecting lever connected thereto for actuating said selecting switch to connect a program channel of said recording and reproducing means to a student channel of said recording and reproducing means in order to cause the recording and reproducing means to function as a conventional monoural tape recorder and function as said instructional tape recorder selectively, a first sensing means for detecting the presence or absence of a breakout lug in one of the pair of holes and a second sensing means for detecting the presence or absence of a breakout lug in the further hole, first and second electrical switches connected respectively to said first and second sensing means, an electrical circuit connected with said recording switch, said selecting switch, and said first and second electrical switches for stopping the recording operation of said instructional tape recorder, said electrical circuit connecting said switches to keep said tape recorder operating in the recording operation when said selecting switch is positioned for instructional tape recorder functioning and the breakout lugs in said holes are broken out and not sensed or when said breakout lugs in said pair of holes are not broken out and sensed and said selecting lever is actuated to cause said taper recorder to function as a conventional tape recorder.

11. An instructional tape recorder as claimed in claim 10 further comprising a locking means connected with said actuator and with said selecting lever for locking said selecting lever against operation when said actuator is moved to actuate said recording switch.

* * * * *